United States Patent
Sautter

(10) Patent No.: US 7,019,322 B2
(45) Date of Patent: Mar. 28, 2006

(54) OPTICAL SENSOR FOR DETECTING MOISTURE ON A SURFACE

(75) Inventor: Helmut Sautter, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 10/363,707

(22) PCT Filed: Jul. 3, 2002

(86) PCT No.: PCT/DE02/02421

§ 371 (c)(1),
(2), (4) Date: Sep. 4, 2003

(87) PCT Pub. No.: WO03/004321

PCT Pub. Date: Jan. 16, 2003

(65) Prior Publication Data
US 2004/0027666 A1 Feb. 12, 2004

(30) Foreign Application Priority Data
Jul. 6, 2001 (DE) ................................. 101 32 889

(51) Int. Cl.
*G02B 6/42* (2006.01)

(52) U.S. Cl. .................. 250/577; 250/227.25; 340/602
(58) Field of Classification Search ........... 250/227.25, 250/574, 577; 15/DIG. 15; 340/602–604; 318/444, 480, 483, DIG. 2; 385/12
See application file for complete search history.

(56) References Cited

U.S. PATENT DOCUMENTS

| | | | |
|---|---|---|---|
| 5,391,891 A * | 2/1995 | Wiegleb et al. | 250/574 |
| 5,898,183 A * | 4/1999 | Teder | 250/574 |
| 6,307,198 B1 * | 10/2001 | Asakura et al. | 250/227.25 |
| 6,668,104 B1 * | 12/2003 | Mueller-Fiedler et al. | 385/12 |

FOREIGN PATENT DOCUMENTS

| | | |
|---|---|---|
| DE | 198 15 747 | 10/1999 |
| DE | 199 43 887 | 3/2000 |
| DE | 199 09 989 | 9/2000 |
| EP | 0 999 104 | 5/2000 |

* cited by examiner

Primary Examiner—Stephone B. Allen
(74) Attorney, Agent, or Firm—Kenyon & Kenyon

(57) ABSTRACT

An optical sensor (5) for recording wetting of a surface (20) of a member (21), especially a window of a motor vehicle, having a transmitter (13), a receiver (14) and a retroreflector (11, 11', 11") for electromagnetic waves is proposed. The surface (20) of the member (21) has for this at least two sensing regions (12, 12'), which are exposed to electromagnetic waves originating from the transmitter (13) and coupled into the member (21) in a central region (10), the development of wetting on the sensing regions (12, 12') effecting a change of the signal of the electromagnetic waves coupled out into the receiver (14) in the central region (10).

For this, the retroreflector (11, 11', 11") is developed and positioned in such a way that it feeds back electromagnetic waves reflected by the surface (20) of the member (21) to the surface (20) of the member (21), and from there into the central region (10).

21 Claims, 1 Drawing Sheet

OPTICAL SENSOR FOR DETECTING MOISTURE ON A SURFACE

BACKGROUND INFORMATION

An optical sensor for recording the wetting of a surface, particularly the wetting of a motor vehicle window, is described in German Published Patent Application No. 199 43 887 having a transmitter and a receiver for electromagnetic waves, the surface being present in a sensing region between the transmitter and the receiver, so that the formation of a wetting on the surface effects a change in the signal detected by the receiver. Furthermore, in that location the optical sensor has a light guiding element by which the electromagnetic waves are bidirectionally guided into the sensing region or guided away from the sensing region. Finally, it is known from German Published Patent Application No. 199 43 887 that one may position a retroreflector, particularly a holographic retroreflector, in such a way that it feeds back electromagnetic waves reflected by the surface to the surface, and from there to the light guiding element. The optical sensor thus described may be used especially as a rain sensor, the light coupled in when the window is dry being totally reflected at the window's outer surface, whereas, when the window is wet, the total reflection is interrupted, which is what effects the detected signal change.

Another rain sensor is described in European Published Patent Application No. 0 999 104 in which a holographic film is situated between sensor and receiver.

SUMMARY OF THE INVENTION

As compared to the related art, the optical sensor according to the present invention has the advantage that it has a larger sensitive surface. This makes it possible to increase the sensitivity of the sensor and to lower the response threshold, while at the same time miniaturizing the evaluation electronics and the other electronic components, such as the transmitter and the receiver.

Besides that, the optical sensor according to the present invention also makes it possible to classify the intensity of the rain, so that the sensor signal is not only able to be used for switching on or off a windshield wiper of a motor vehicle, but also, for example, for controlling the wiper's frequency or rather the length of the intervals between individual wiping procedures.

A further advantage of the optical sensor according to the present invention is that, because of the plurality of sensing regions provided, it is able to keep functioning even when one of these sensing regions fails, i.e. it is overall more reliable and less susceptible to faults, or rather has a redundant function in this respect.

Finally, because of the plurality of sensing regions provided, an overall more favorable arrangement of the retroreflectors relative to the central region is achieved, or rather to the electronic components that are in connection with the central region, which leads to an overall better usage of the available surface of the field, which may, in the case of motor vehicle windows, be as small as possible for reasons of an undesired impairment of the view of the driver.

Thus, it is advantageous, with respect to a miniaturization that goes as far as possible, if the at least one transmitter and the at least one receiver are present in the central region.

Besides that, the central region may advantageously be made smaller, with respect to the surface required, in that the transmitter and/or the receiver are accommodated in a separate component outside the central region. In this case then, as already described in German Published Patent Application No. 199 43 887, a first light guiding element that is in contact with the transmitter, and a second light guiding element that is in contact with the receiver, are guided from this component into the central region, and they are additionally connected to a coupling-in element or coupling-out element that are situated in the central region and are respectively associated with the appropriate light guiding element.

In order to achieve a surface usage that is as optimal as possible and a compact type of construction, it is also advantageous if an even number, particularly two, four or six sensor regions are provided which lie opposite to each other, pair by pair, with respect to the central region.

When it comes to the aspect of the coupled-in electromagnetic waves being applied to the sensing regions in as simple, as uniform and as complete a manner as possible, as well as of as good as possible a surface usage, it is additionally advantageous if the sensing regions are developed fan-shaped, circular segment-shaped, circular sector-shaped or circular ring-shaped. By the way, however, instead of the plane shapes related to a circle, plane shapes related to an ellipse also come into consideration.

The retroreflector is advantageously a holographic retroreflector which has two focal points, in one of the focal points the transmitter and in the other the receiver being situated, or rather, in one of the focal points the coupling-in element for the sensor and in the other focal point the coupling-out element for the receiver being located.

DETAILED DESCRIPTION

Figure 1:
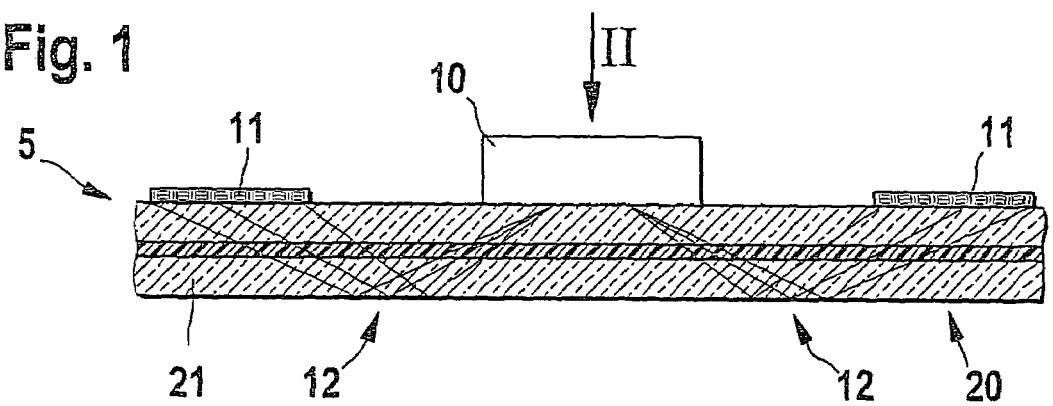
FIG. 1 shows a section through a window of a motor vehicle which is provided with an optical sensor in the form of a rain sensor.

FIG. 1 shows a section through a window 21 of a motor vehicle, on which on one side there is a central region 10, from which, as seen in the top view, two semicircular electromagnetic waves proceed, which impinge upon two semicircularly designed sensing regions 12 associated with them, from there are reflected in each case, or rather are totally reflected, provided window 21 is dry on its surface 20 in the area of sensing regions 12, from sensing regions 12 strike two semicircular retroreflectors 11 associated with sensing regions 12, which are designed in the form of holographic retroreflectors 11 having two focal points 22, 23, and are then fed back again by the retroreflectors 11 via sensing regions 12 into central region 10.

Figure 2:
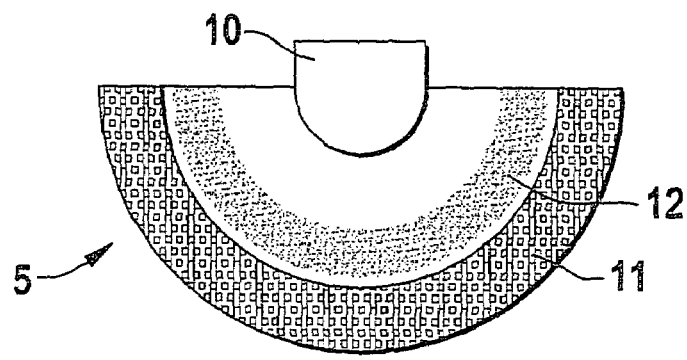
FIG. 2 shows a top view on the lefthand side or the righthand side of FIG. 1 along the section line drawn in there.

FIG. 2 shows a top view of FIG. 1, only one half of central region 10, or rather one of the two semicircular sensing regions 12 and the associated semicircular retroreflectors 11 being shown.

Thus, overall, central region 10, together with sensing regions 12, retroreflectors 11 and window 21 which has the electromagnetic waves impinging on it, forms an optical sensor 5 which is sensitive to wetting of sensing regions 12, and thus of window 21.

In particular, in central region 10 a change in the intensity of the electromagnetic waves reflected back to there from the two sensing regions 12 is detected separately for the two, as soon as, for example, in at least one of sensor regions 12, by the formation of wetting by rain or fog, the condition for the appearance of total reflection of the magnetic waves irradiating sensor regions 12 changes, i.e. the total reflection given when window 21 is dry is interrupted when window 21 is wet.

In the explained exemplary embodiment as in FIG. 1, central region 10 also has two coupling-in elements corresponding to the number of sensor regions 12, via which sensor regions 12 are able to be impinged upon with electromagnetic waves by two light-emitting diodes integrated into central region 10, which are each provided as transmitters 13.

However, instead of two light-emitting diodes in central region 10, one may also provide only one light-emitting diode, as common transmitter 13 for all sensor regions 12, downstream from which is placed a customary beam splitter which is adapted to the number of sensing regions 12. By the way, the beam splitter may also be integrated into the coupling-in element.

Besides that, central region 10 according to FIG. 1 or 2 also has two coupling-out elements per number of sensing regions 12, via which the change in the measuring signals occurring in sensing regions 12 may be detected using two separate receivers 14, such as photodiodes, which are each assigned to the coupling-out elements and integrated into the central region.

Preferably, a separate receiver 14 is provided in central region 10 for each sensing region 12, so that a spatially resolved change in the signal is possible, i.e. an assignment of a signal change to a sensing region 12.

However, transmitter 13 and/or receiver 14 may also be positioned outside central region 10, as an alternative to positioning them in central region 10, as is known from DE 199 43 887 A1. In this case, then, transmitter 13 and/or receiver 14 are connected to the coupling-in element and coupling-out element, associated in each case and situated in central region 10, via a light guiding element, such as a monomode or multimode light guide or a bundle of such light guides.

Figure 3:
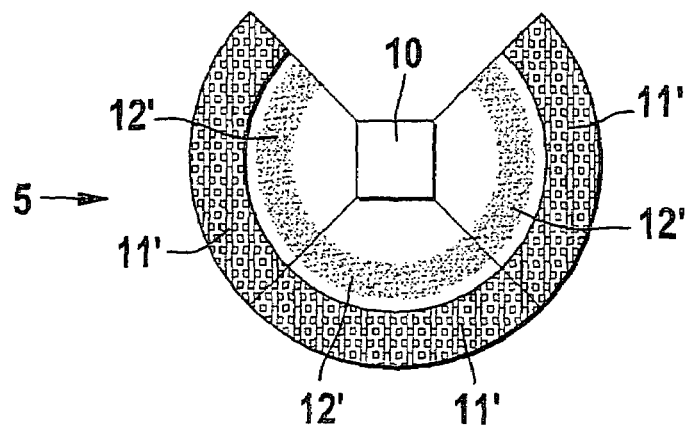
FIG. 3 shows a top view of a further exemplary embodiment similar to FIG. 1, for an optical sensor in the form of a rain sensor.

FIG. 3 shows a further exemplary embodiment of an optical sensor 5 having three sensing regions 12, which each cover an angular region of ca 90°, the three retroreflectors 11, assigned to the three sensing regions 12 being also structured in a corresponding circular ring shape. The exemplary embodiment according to FIG. 3 is largely analogous to the exemplary embodiment according to FIGS. 1 and 2, apart from the number and shape of sensing region 12' and retroreflectors 11' as well as the correspondingly adapted design of central region 10.

A continuation of the exemplary embodiment according to FIG. 3 provides for forming sensing regions 12' in such a way that they cover an angular region of 30° to 120° in each case, especially 60° to 120°. In this context, the number of circular ring-shaped sectors or sensing regions 12' may also be other than three, in deviation from FIG. 3. Preferably the number of circular ring-shaped sectors or sensing regions 12' lies between two and six, they also being formed in such a way that they cover the greatest angular range possible, ideally 360°.

In the previously explained exemplary embodiments it is finally preferably provided that the shape of retroreflectors 11, 11' is adapted to the shape of sensing regions 12, 12'. In this connection, it is especially preferred if both the shape and the number of retroreflectors 11, 11' correspond to the shape and number of sensing regions 12, 12'.

By the way, retroreflectors 11, 11' according to FIGS. 1 to 3, are preferably holographic retroreflectors 11, 11', as is known from DE 199 43 867 A1, which are pasted onto window 21 in the form of a foil, a sheet or a flat glass plate. However, as an alternative, such holographic retroreflectors 11, 11' may also have been integrated into the interior or the surface of window 21, for instance, as early as during its production.

The coupling-out elements and the coupling-in elements which are located in central region 10 are formed in a known way, for example by a deflector, a prism or a grating.

Figure 4:
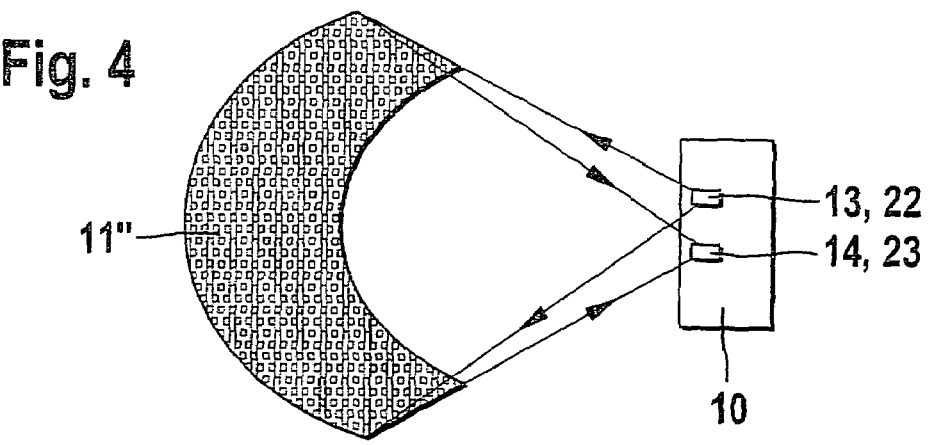
FIG. 4 shows the optical path in a holographic retroreflector having two focal points.

Finally, FIG. 4 explains schematically the positioning of transmitter 13 and receiver 14 in central region 10, in a top view, a retroreflector 11" being drawn in which is designed in the shape of a section of an elliptical ring. This retroreflector 11" has two focal points 22, 23, so that electromagnetic waves originating from transmitter 13 in first focal point 22 is reflected via sensing region 12, 12' (not shown) and the associated retroreflector 11" to second focal point 23, and thus back to the location of receiver 14.

By the way, with regard to further details known per se of the design of optical sensor 5, we refer the reader to Application DE 199 43 887 A1. In particular, retroreflectors 11, 11', 11", as described there, may also be designed as mirror segments or concentrating reflector segments, which focus the electromagnetic waves onto the coupling-out element or receiver 14.

What is claimed is:

1. An optical sensor for recording a wetting of a surface of a member, comprising:
    at least one transmitter;
    at least one receiver;
    at least one retroreflector for electromagnetic radiation;
    at least two sensing regions included on the surface and being exposable to an electromagnetic wave from the at least one transmitter; and
    a central region arranged in the member and into which are coupled the at least two sensing regions, wherein:
        a development of the wetting on the at least two sensing regions effects a change of a signal of the electromagnetic wave coupled out into the at least one receiver in the central region,
        the at least one retroreflector is developed and positioned in such a way that the at least one retroreflector feeds back the electromagnetic wave reflected by the surface of the member to the surface of the member, and from the surface of the member into the central region, and
        the at least two sensing regions are impinged upon by the electromagnetic wave via the central region.

2. The optical sensor as recited in claim 1, wherein:
    the surface includes a window of a motor vehicle.

3. The optical sensor as recited in claim 1, wherein:
    at least one of the at least one transmitter and the at least one receiver is situated in the central region.

4. The optical sensor as recited in claim 1, wherein the at least two sensing regions have a shape that is one of:
    fan-shaped,
    circular segment-shaped,
    circular sector-shaped, circular ring-shaped, and
a sheetlike shape using an ellipse as a point of departure.

5. The optical sensor as recited in claim 1, wherein:
the at least two sensing regions cover an angular range of 300 to 1800.

6. The optical sensor as recited in claim 1, wherein:
the at least two sensing regions cover an angular range of 600 to 1200.

7. The optical sensor as recited in claim 1, wherein:
a shape of the at least one retroreflector is adapted to a shape of the at least two sensing regions.

8. The optical sensor as recited in claim 1, wherein:
a shape and a number of the at least one retroreflector are adapted to a shape and a number of the at least two sensing regions.

9. The optical sensor as recited in claim 1, wherein:
the at least one transmitter includes separate transmitters separately assigned to each of the at least two sensing regions.

10. The optical sensor as recited in claim 1, wherein:
the at least one transmitter includes a common transmitter assigned to the at least two sensing regions, and
the common transmitter includes a beam splitter downstream that is integrated into a coupling-in element and is designed corresponding to a number of the at least two sensing regions.

11. The optical sensor as recited in claim 1, wherein:
the at least one receiver includes separate receivers separately assigned to each of the at least two sensing regions.

12. The optical sensor as recited in claim 1, wherein:
the at least one receiver includes a common receiver assigned to the at least two sensing regions.

13. The optical sensor as recited in claim 1, wherein:
the at least one retroreflector includes a holographic retroreflector.

14. The optical sensor as recited in claim 1, wherein:
the at least one retroreflector includes two focal points, one of the focal points copying the electromagnetic wave onto one of a coupling-in element and the at least one transmitter, and another one of the focal points copying the electromagnetic wave onto one of a coupling-out element and the at least one receiver.

15. The optical sensor as recited in claim 1, wherein:
a number of the at least two sensing regions is even, and
the at least two sensing regions lie opposite each other in pairs with respect to the central region.

16. The optical sensor as recited in claim 15, wherein:
the number of the at least two sensing regions includes one of two, four, and six sensing regions.

17. The optical sensor as recited in claim 1, wherein:
the central region includes at least one coupling-in element via which the at least two sensing regions are able to be impinged upon by the electromagnetic wave originating from the at least one transmitter.

18. The optical sensor as recited in claim 17, wherein:
the central region includes at least one coupling-out element via which the change in the signal occurring in the at least two sensing regions is able to be coupled out into the at least one receiver.

19. The optical sensor as recited in claim 18, wherein:
the at least one transmitter is connected to the coupling-in element, and
the at least one receiver is connected to the coupling-out element.

20. The optical sensor as recited in claim 18, further comprising:
a light-guiding element, wherein:
the at least one transmitter is connected to the coupling-in element via the light guiding element, and
the at least one receiver is connected to the coupling-out element via the light guiding element.

21. The optical sensor as recited in claim 20, wherein:
the light guiding element includes one of a monomode light guide, a multimode light guide, a bundle of one of monomode light guides and multimode light guides, and a plate.

* * * * *

UNITED STATES PATENT AND TRADEMARK OFFICE
CERTIFICATE OF CORRECTION

PATENT NO. : 7,019,322 B2
APPLICATION NO. : 10/363707
DATED : March 28, 2006
INVENTOR(S) : Sautter Page 1 of 2

It is certified that error appears in the above-identified patent and that said Letters Patent is hereby corrected as shown below:

On the Title of the patent, #(57) under the heading "ABSTRACT", line 1, delete "(5)" and "(20)"

On the Title of the patent, #(57) under the heading "ABSTRACT", line 2, delete "(21)"

On the Title of the patent, #(57) under the heading "ABSTRACT", line 3, delete "(13)" and "(14)"

On the Title of the patent, #(57) under the heading "ABSTRACT", line 4, delete "(11, 11', 11'')"

On the Title of the patent, #(57) under the heading "ABSTRACT", line 5, delete "(20)" and "(21)"

On the Title of the patent, #(57) under the heading "ABSTRACT", line 6, delete "(12,12')"

On the Title of the patent, #(57) under the heading "ABSTRACT", line 7, delete "(13)"

On the Title of the patent, #(57) under the heading "ABSTRACT", line 8, delete "(21)" and "(10)"

On the Title of the patent, #(57) under the heading "ABSTRACT", line 9, delete "(12,12')"

On the Title of the patent, #(57) under the heading "ABSTRACT", line 11, delete "(14)" and "(10)"

On the Title of the patent, #(57) under the heading "ABSTRACT", line 12, delete "(11, 11', 11'')"

On the Title of the patent, #(57) under the heading "ABSTRACT", line 14, delete "(20)" and "(21)"

On the Title of the patent, #(57) under the heading "ABSTRACT", line 15, delete "(20)" and "(21)"

UNITED STATES PATENT AND TRADEMARK OFFICE
CERTIFICATE OF CORRECTION

PATENT NO. : 7,019,322 B2
APPLICATION NO. : 10/363707
DATED : March 28, 2006
INVENTOR(S) : Sautter It is certified that error appears in the above-identified patent and that said Letters Patent is hereby corrected as shown below:

On the Title of the patent, #(57) under the heading "ABSTRACT", line 16, delete "(10)"

Signed and Sealed this

Thirteenth Day of November, 2007

JON W. DUDAS
*Director of the United States Patent and Trademark Office*